United States Patent
Crooks

(10) Patent No.: US 9,519,816 B2
(45) Date of Patent: Dec. 13, 2016

(54) METHOD AND APPARATUS FOR OPTIMIZING OPTICAL CODE SCANNING

(71) Applicant: John F. Crooks, Duluth, GA (US)

(72) Inventor: John F. Crooks, Duluth, GA (US)

(73) Assignee: NCR CORPORATION, Duluth, GA (US)

(*) Notice: Subject to any disclaimer, the term of this patent is extended or adjusted under 35 U.S.C. 154(b) by 387 days.

(21) Appl. No.: 13/931,037

(22) Filed: Jun. 28, 2013

(65) Prior Publication Data

US 2015/0001299 A1 Jan. 1, 2015

(51) Int. Cl.
*G06K 7/10* (2006.01)

(52) U.S. Cl.
CPC ........... *G06K 7/1096* (2013.01); *G06K 7/1095* (2013.01); *G06K 7/10584* (2013.01); *G06K 7/10792* (2013.01)

(58) Field of Classification Search
CPC .............. G06K 7/1096; G06K 7/10574; G06K 7/10584; G06K 7/10693; G06K 7/10792; G06K 7/10821; G06K 7/10831; G06K 7/1095
USPC .......... 235/462.32, 462.35–462.41, 440, 454
See application file for complete search history.

(56) References Cited

U.S. PATENT DOCUMENTS

| | | | | |
|---|---|---|---|---|
| 6,164,546 A * | 12/2000 | Kumagai et al. | ........ | 235/472.01 |
| 8,622,299 B2 * | 1/2014 | Crooks | ............... | G06K 7/0004 |
| | | | | 235/435 |
| 8,910,871 B1 * | 12/2014 | Powell | .............. | G06K 7/10722 |
| | | | | 235/462.07 |
| 9,016,582 B2 * | 4/2015 | Panday | .................. | G06K 7/146 |
| | | | | 235/375 |
| 2002/0070278 A1 * | 6/2002 | Hung | ................. | G06K 7/10702 |
| | | | | 235/472.01 |
| 2003/0085284 A1 * | 5/2003 | Bremer | ............. | G06K 7/10554 |
| | | | | 235/462.32 |
| 2009/0001163 A1 * | 1/2009 | Barkan | .............. | G06K 7/10722 |
| | | | | 235/454 |
| 2010/0019043 A1 * | 1/2010 | Sackett et al. | ........... | 235/462.42 |
| 2010/0252635 A1 * | 10/2010 | Drzymala et al. | ....... | 235/462.41 |
| 2012/0000982 A1 * | 1/2012 | Gao | ........ | G06K 7/146 |
| | | | | 235/455 |
| 2012/0111944 A1 * | 5/2012 | Gao | ..................... | G06K 7/1443 |
| | | | | 235/462.01 |
| 2013/0062412 A1 * | 3/2013 | Tan | ...................... | G06K 7/1095 |
| | | | | 235/455 |
| 2013/0062413 A1 * | 3/2013 | Nahill | ................ | G06K 7/10198 |
| | | | | 235/462.25 |
| 2014/0061291 A1 * | 3/2014 | Madej | .................. | G07G 1/0018 |
| | | | | 235/375 |
| 2014/0061308 A1 * | 3/2014 | Madej et al. | ................. | 235/440 |

* cited by examiner

*Primary Examiner* — Suezu Ellis
(74) *Attorney, Agent, or Firm* — Harden E. Stevens, III; Paul W. Martin

(57) ABSTRACT

An optical code scanner is presented that includes multiple scanning windows for reading an optical code where each scanning window can be optimized for reading optical codes presented in either printed or electronic form. The optical code scanner supports multiple scanning modes where each scanning mode is based on a different method of reading optical codes and each method offers different advantages. Each of the multiple scanning windows is assigned to use one of the scanning modes. The scanning mode for a window can also be reassigned at any time to a different mode.

6 Claims, 5 Drawing Sheets

METHOD AND APPARATUS FOR OPTIMIZING OPTICAL CODE SCANNING

FIELD OF THE INVENTION

The present invention relates to optical code scanners and more specifically to optical code scanners with multiple scanning windows where each scanning window is optimized to scan printed optical codes or electronic optical codes or a combination of printed and electronic optical codes.

BACKGROUND

Optical code scanners are used in point of sale (POS) terminals to read optical codes on items which are presented to the POS terminals for purchase as part of a purchase transaction. As part of the purchase transaction, a customer may present coupons or other documents that include optical codes which must be read. Optical code scanners use image based scanning technology to scan optical codes through one or more scanning windows. Image based scanning technology captures an image of an optical code presented to the optical code scanner through one of the scanning windows. The optical codes being presented may be printed on a substrate or displayed on a display of a portable electronic device. However, image based scanning technology must be optimized for the method in which the optical code is being presented or the optical code scanner will fail to read the optical code which slows down the purchase transaction.

SUMMARY

Among its several aspects, the present invention seeks to overcome or ameliorate at least one of the disadvantages of the prior art, or to provide a useful alternative.

Among its several aspects, the present invention recognizes there are multiple methods for scanning optical codes and that some of the methods can be optimized for reading printed optical codes and others can be optimized for reading electronic optical codes. The invention further recognizes that assigning each scanning window of an optical code scanner to a single scanning method will improve the optical code scanner's ability to read an optical code on the first attempt.

In accordance with the teachings of the present invention, an optical code scanner is provided for scanning optical codes. The optical code scanner includes multiple scanning windows where each scanning window is assigned to use one of multiple different scanning modes. The different scanning modes determine both the initial and continuing settings for the illumination device and image capture device that use the window assigned to use the scanning mode.

Among its several aspects, the present invention recognizes there is an advantage to being able to change the scanning mode assigned to a given scanning window when it is determined that the form of optical codes being presented to the window has changed. This can occur at different times during a purchase transaction. For example during item identification, the probability of scanning printed optical codes is higher than scanning electronic optical codes but during the payment phase when coupons are entered, the probability of scanning electronic optical codes is higher.

In accordance with an embodiment of the present invention, there is provided a computer implemented method for controlling an optical code scanner that reads optical codes presented in printed and electronic form. The method comprises the steps of: assigning a first predetermined scanning mode to a first scanning window that optimizes readability for a single form of optical codes presented to the first scanning window; assigning a second predetermined scanning mode to a second scanning window that optimizes readability for optical codes presented to the second scanning window by using a variable duty cycle for reading the different forms of optical codes; capturing an image of an optical code through the first scanning window and an image of the optical code through the second scanning window; and processing the two captured images to identify and read the optical code from at least one of the captured images.

In accordance with an embodiment of the present invention, there is provided an optical code scanner comprising: a housing including a plurality of surfaces; a first and second scanning window each located on a different surface of the housing; a first image capture device located within the housing such that it receives an image through the first scanning window; a first illumination device located within the housing such that it directs light generated by the device through the first scanning window; a second image capture device located within the housing such that it receives an image through the second scanning window; a second illumination device located within the housing such that it directs light generated by the device through the second scanning window; and a processor located within the housing and configured to execute instructions stored in a memory where the instructions cause the processor to perform the following steps: configure settings for the first image capture device and the first illumination device to a first predetermined scanning mode that optimizes reading optical codes presented in one form through the first window; and configure settings for the second image capture device and the second illumination device to a second predetermined scanning mode that optimizes reading different types of optical codes by using a variable duty cycle through the second window.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention.

However, it will be understood by those skilled in the art that aspects of the claimed invention may be practiced without utilizing all of these details and that numerous variations or modifications from the described embodiments are possible and envisioned.

Figure 1:
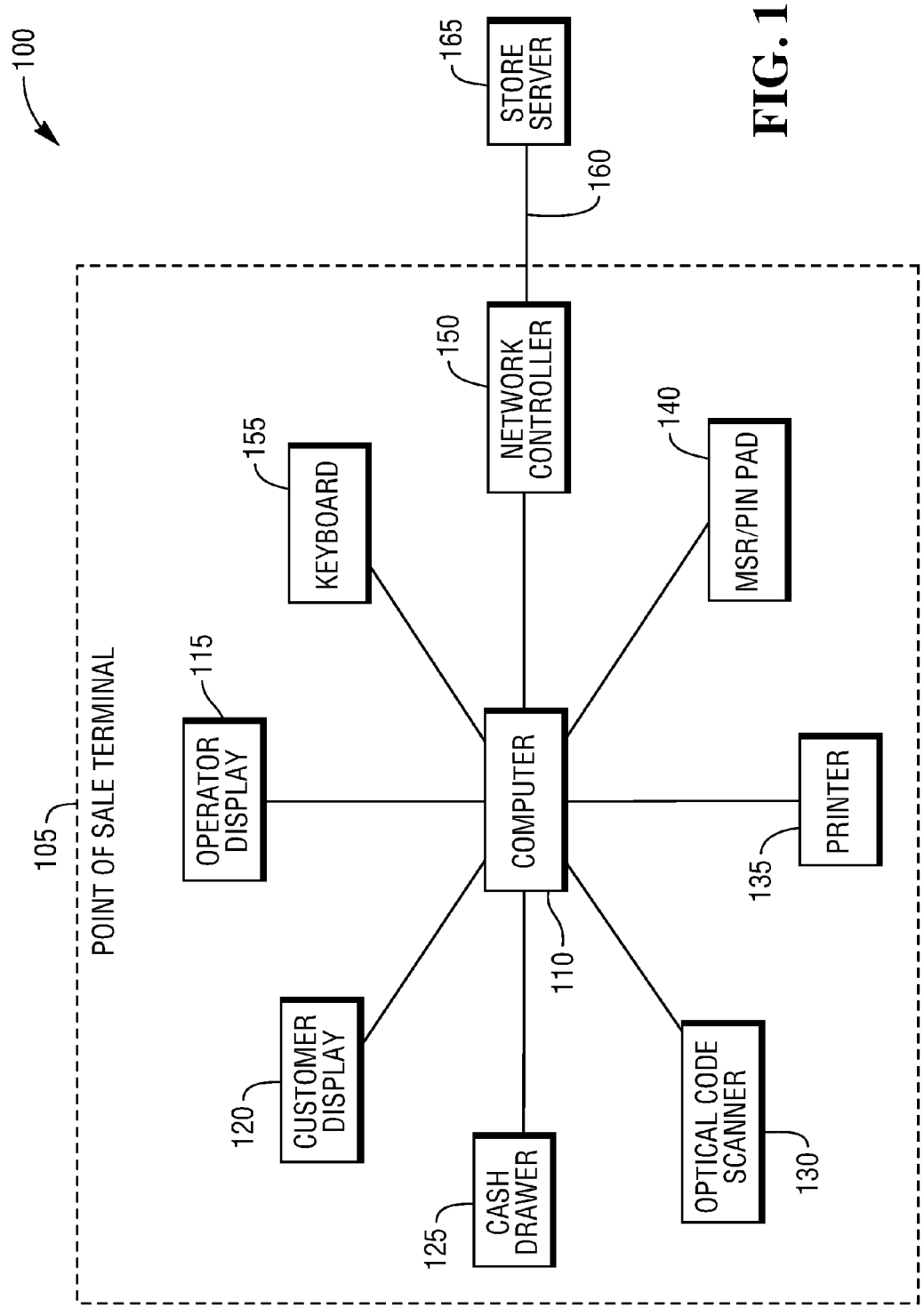
FIG. 1 is a high-level block diagram illustrating a retail point of sale system of the present invention.

With reference to FIG. 1, there is provided a high-level block diagram illustrating a point of sale system 100 including a point of sale (POS) terminal 105 that uses a network 160 to communicate with a store server computer 165. The point of sale system 100 may suitably include more than one POS terminal 105 where each POS terminal 105 communicates over the network 160 with the store server computer 165. The POS terminal 105 may be implemented as either an assisted or a customer operated POS terminal.

In this embodiment, the POS terminal 105 includes a computer 110 and a number of components and peripherals that are controlled by the computer 110. The POS terminal 105 further includes an operator display 115, a customer display 120, a cash drawer 125, an optical code scanner 130, a printer 135, a magnetic stripe reader (MSR) and personal identification number (PIN) pad 140, a network controller 150 and a keyboard 155.

Figure 2:
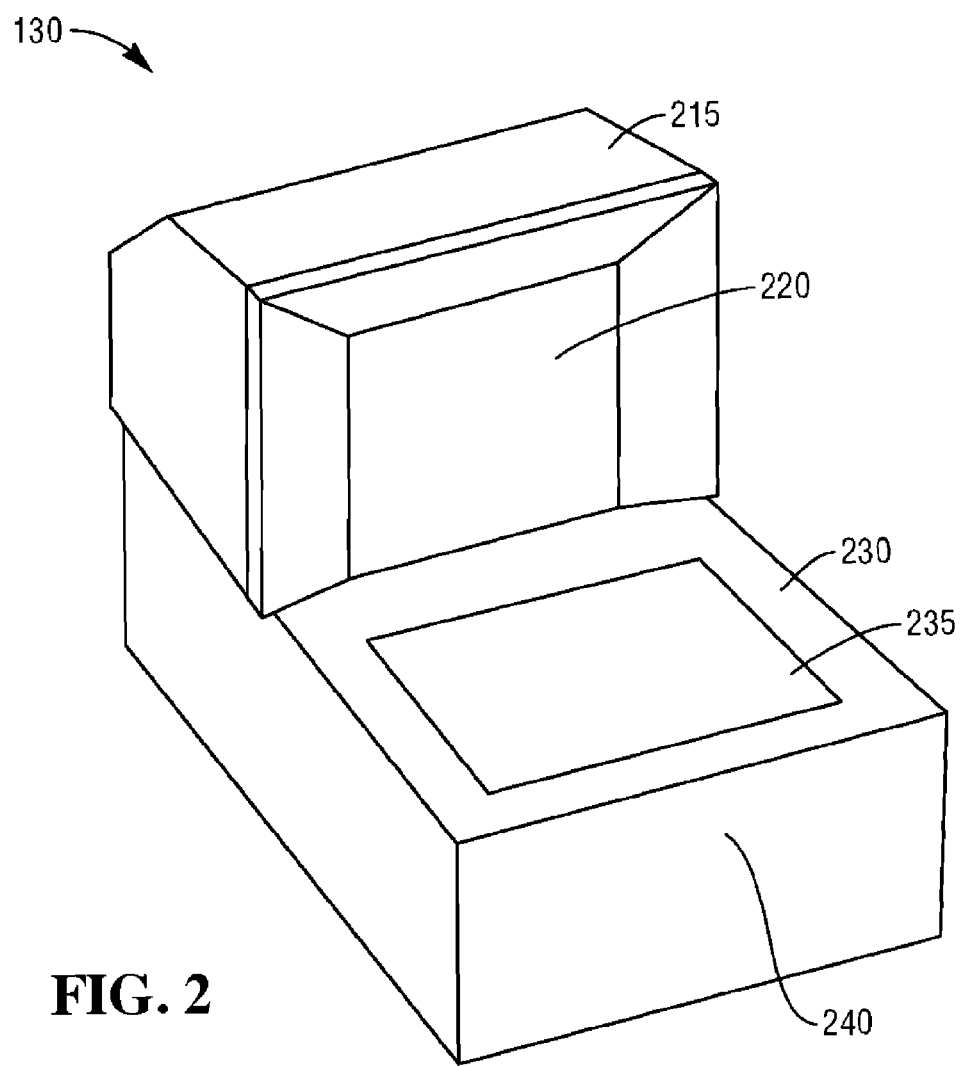
FIG. 2 is a high-level drawing illustrating an optical code scanner of the present invention.

The operator display 115 displays information used by a cashier to operate the POS terminal 105. In this embodiment, the cashier is a trained operator employed to, at least in part, operate the POS terminal 105. The keyboard 155 is used by the cashier to input data and commands to the computer 110. The cash drawer 125 is controlled by the computer 110 and stores currency, checks, coupons and the like. In some embodiments, the cash drawer 125 is replaced by an automatic cash acceptor/dispenser which is controlled by the computer 110 and accepts and dispenses currency. The optical code scanner ("scanner") 130 is used to read optical codes presented to the POS terminal 105 for identification. In some embodiments, the scanner 130 includes a weigh scale as part of a horizontal window (FIG. 2, 235). The weigh scale determines the weight of an item placed on the horizontal window 235. The customer display 120 is visible to the customer and used to display information about the transaction to the customer.

The network controller 150 has hardware and software necessary to support a connection to the local area network 160 and for the computer 110 to communicate over the local area network 160 to the store server 165 or other computers and POS terminals on the network 160 or to computers on other networks connected to the local area network 160. In some embodiments, the network controller 150 supports a transmission control protocol/internet protocol (TCP/IP) network protocol and the local area network 160 is an Ethernet network.

The MSR/PIN PAD 140 reads information from a magnetic stripe usually attached to the back of a card, such as a credit/debit card, loyalty card or the like. The PIN pad portion 140 is used to enter PIN numbers associated with a credit or debit card. The MSR/PIN Pad 140 device also includes software and hardware to communicate with an external server used to process credit transactions. The printer 135 is used to print customer receipts and other documents.

The store server 165 includes software and data used to process purchase transactions being performed at the POS terminal 105. The data includes a product lookup database that is used to identify items presented to the POS terminal 105 for purchase. When an optical code is scanned by the POS terminal 105, information read from the optical code is sent to the store server 165 and used to identify a data record in the product lookup database. The data record includes information about the item the optical code is attached to including a price and description of the item. This information is returned back to the POS terminal 105 and is used to process a purchase transaction. The store server 165 also maintains information on all purchase transactions performed by the POS terminal 105 and can either process payment requests or contact external computer servers that will process the payment requests.

Referring now to FIG. 2, there is provided a high-level drawing illustrating an exemplar embodiment of the optical code scanner 130. The optical code scanner 130 reads optical codes presented to the optical code scanner 130. An optical code is a computer readable representation of information. In this embodiment, optical codes can be attached to or printed on an item or object or displayed on an electronic display such as the display screen of a cell phone or tablet computer. The optical code may suitably include one dimensional and two dimensional bar codes. The optical code scanner 130 can read optical codes based on symbologies that include but are not limited to: UPS, EAN, Code 128, GS1 DataBar™, Datamatrix, Aztec, QR and MaxiCode.

The scanner 130 includes the horizontal scanning window 235 and a vertical scanning window 220. The horizontal scanning window 235 is housed in a horizontal housing component 230 of the scanner 130. The vertical scanning window 220 is housed in a vertical housing component 215 of the scanner 130 and faces an operator side 240 of the scanner 130. The side of the vertical housing component 215 that houses the vertical scanning window 220 is the front of the scanner 130 and faces the operator of the scanner 130. The two scanning windows 220, 235 are composed of an optically transparent material such as hurricane glass or sapphire coated glass.

An operator scans an item by orienting an optical code on an item or device so it faces either the vertical scanning window 220 or the horizontal scanning window 235 and then moving the item past the windows. The scanner 130 produces an indication, such as an audio sound or a light, once the optical code has been identified and read. The scanner 130 uses imaging technology to capture an image of the optical code and decode or read it.

In some embodiments, the scanner 130 also includes laser scanning technology that uses one or more lasers to scan and read an optical code. The laser beams from the laser are directed to form scanning patterns through the vertical scanning window 220 and the horizontal scanning window 235. When a directed laser beam strikes and moves across an object presented to the scanner 130, the object reflects a portion of the laser light. Some of the reflected laser light passes back through one of the scanning windows (220 or 235) and is directed to a photodetector that produces electrical signal data proportional to the amount of light received. The received electrical signal data is processed to detect the presence of an optical code and to recover the information associated with the optical code.

Figure 3:
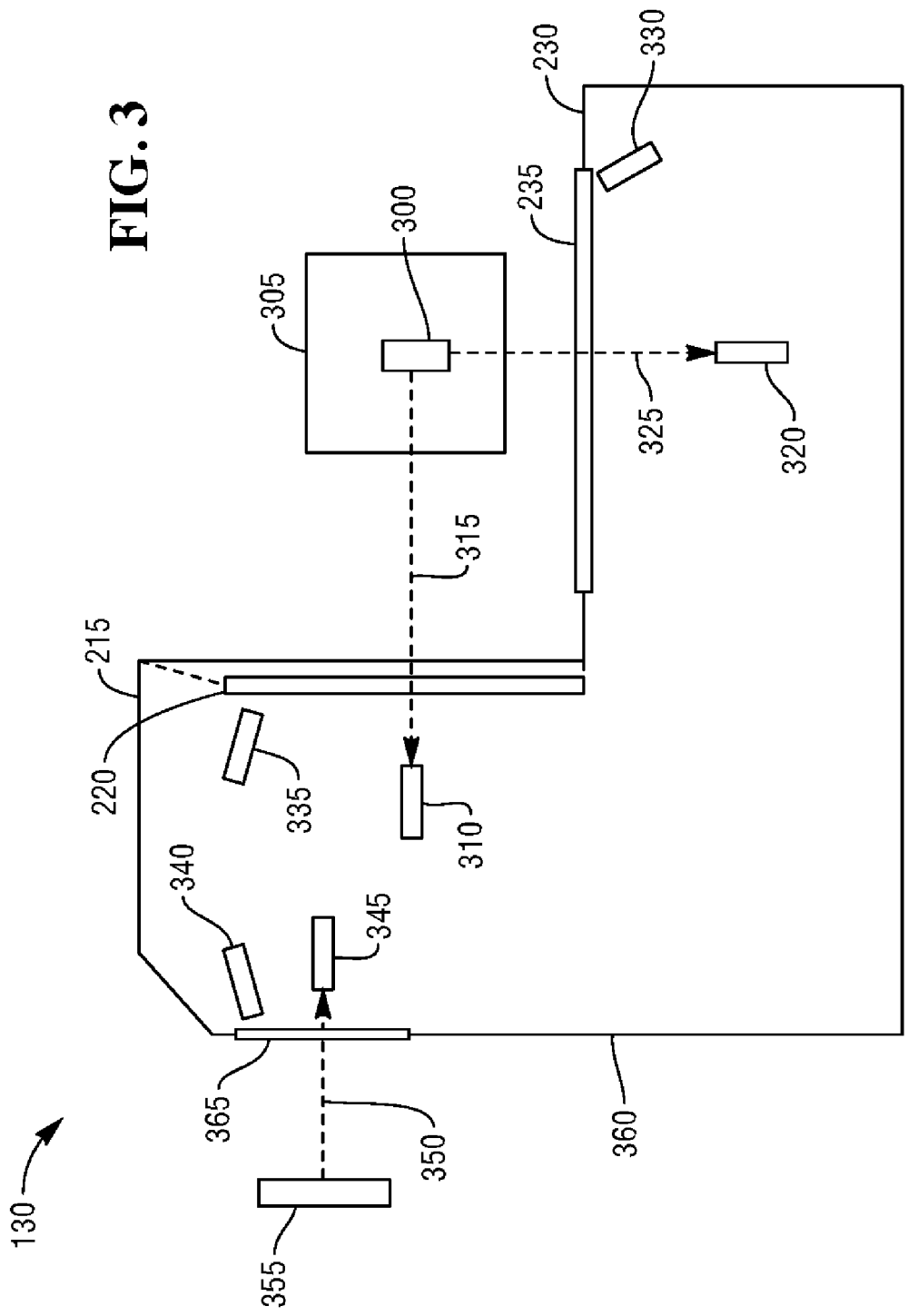
FIG. 3 is a high-level cross-sectional drawing illustrating the optical code scanner.

Referring to FIG. 3, there is provided a high-level cross-sectional drawing further illustrating the exemplar embodiment of the optical code scanner 130. The scanner 130 includes a first image capture device 310 and a second image capture device 320. In some embodiments where the scanner 130 is used in an operator assisted mode, a third image capture device 345 is included that receives images through a customer scanning window 365 located on the customer facing side 360 of the scanner 130. These embodiments include an illumination device 340 that produces and directs light through the customer scanning window 365. In the example depicted in FIG. 3, a smart phone 355 is positioned facing the customer scanning window 365 and the first image capture device 345 receives and captures an image of an optical code being displayed on the smart phone 355 along a third image path 350. It should be noted that an electronic device such as the smart phone 355 can display and present an optical code to any of the scanning windows.

The three image capture devices 310, 320, 345 preferably include a complementary metal oxide semiconductor (CMOS) image capture device. In some embodiments, other types of image capture devices are used such as devices based on charged-coupled device (CCD) technology. The image capture devices 310, 320, 345 capture an electronic image of the optical image directed to the device. The electronic image is captured in the form of digital image data that represents the value of the light received by each pixel of each image capture device 310, 320, 345. In some embodiments, each of the image capture devices 310, 320, 345 includes a lens that focuses images directed at the image capture devices 310, 320, 345 onto the capture surface of the respective image capture devices 310, 320, 345.

Items to be scanned by the scanner 130 on the operator side 240 of the scanner 130 are passed through a target scanning area 305. The target scanning area 305 is a volume of space above the horizontal scanning window 235 and in front of the vertical scanning window 220. Optical codes that pass through the target scanning area 305 will be in the field of view of one of the image capture devices 310, 320. For example, an image of an object 300, located within the target scanning area 305, is received along a first image path 315 and captured by the first image capture device 310. Another image of the object 300 is received along a second image path 325 and captured by the second image capture device 320. The optical codes can be presented in either printed form or electronic form (displayed on an electronic display).

A first illumination device 335 generates and directs light through the vertical scanning window 220 to the target scanning area 305. A second illumination device 330 generates and directs light through the horizontal scanning window 235 to the target scanning area 305. The illumination devices 335, 330, 340 can be turned on and off as required and the output light level can also be adjusted as required. While depicted as single elements, in some embodiments, each of the illumination devices 335, 330, 340 includes a plurality of individual illumination devices such as LEDs that may by positioned in different locations within the scanner 130 and direct light to different portions of the target scanning area 305.

Figure 4:
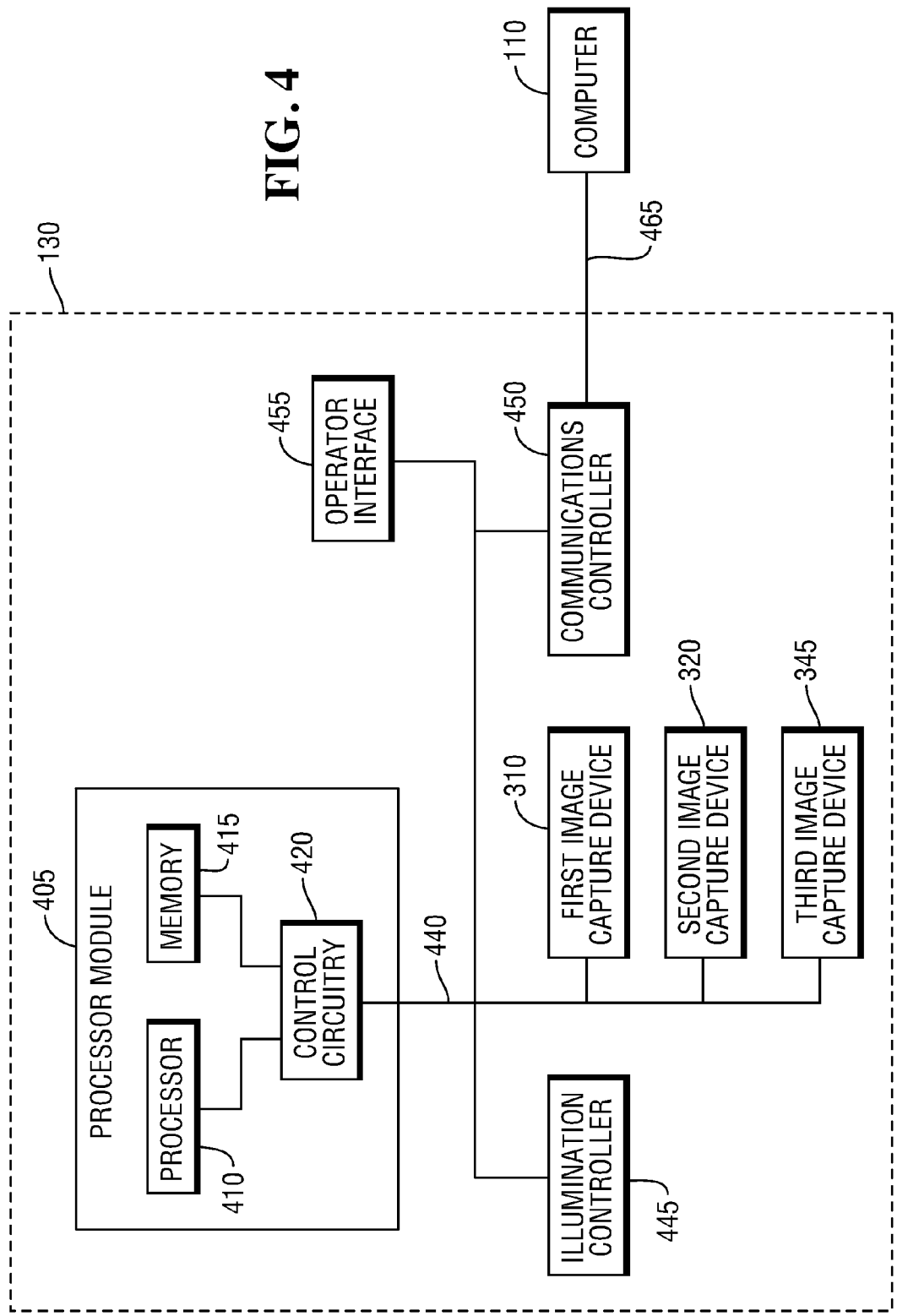
FIG. 4 is a high-level block diagram illustrating selected hardware components of the optical code scanner.

With reference to FIG. 4, there is provided a high-level block diagram illustrating an exemplar embodiment of certain hardware components of the scanner 130. The scanner 130 includes a processor module 405 which includes a processor 410, a memory 415, and control circuitry 420. The memory 415 is non-transitory and computer readable. The memory 415 includes both volatile and non-volatile memory. The non-volatile memory may suitably include solid state and rotating memory devices. The processor 410 executes software stored in the memory 415 which causes the processor 410 to control the components of the scanner 130 and to implement the features and functions of the scanner 130.

The control circuitry 420 includes hardware interfaces between the processor 410 and the memory 415 and between the processor 410 and a bus 440 used to communicate with other components of the scanner 130. The scanner 130 further includes an illumination controller 445, an operator interface 455 and a communications controller 450. The bus 440 also connects to the first image capture device 310, the second image capture device 320 and the third image capture device 345 so that the processor 410 controls each of the image capture devices 310, 320, 345.

The illumination controller 445 controls the illumination devices 335, 330, 340. The controller 445 turns the illumination devices 335, 330, 340 on or off as needed and sets an illumination output level that is between off and full power. The illumination devices 335, 330, 340 may be turned off when the scanner 130 is not in use to save power. Where laser scanning technology is used, the laser and laser directing device, such as a spinner, are turned off to save power and reduce noise.

The communications controller 450 includes the hardware and software required for the scanner 130 to connect to and communicate over the network connection 465 to the computer 110. In some embodiments, the network connection 465 is implemented as a universal system bus (USB). In other embodiments, the network connection 465 is implemented as an RS-232 interface.

The operator interface 455 includes a speaker that produces audible sounds associated with different functions which are used to communicate information to the operator.

The scanner 130 reads optical codes presented to the scanner 130 as part of purchase transactions. The goal of the scanner 130 is to read each optical code on the first pass by the scanner 130. If the scanner 130 fails to read an optical code on the first pass, the additional one or more passes required to read the optical code will increase the time required to process the purchase transaction. The increased time reduces customer satisfaction and the return on investment (ROI) on the POS terminal 105 for the store. The scanner 130 has a number of settings that can be adjusted by the processor 410 that will optimize the scanner's 130 ability to read optical codes on the first pass. These settings, also called readability settings, include parameters that control the level of light that illuminates an area where images of optical codes are captured and certain parameters associated with the image capture devices 310, 320, 345 such as shutter speed.

Optical codes can be presented to the scanner 130 using different methods such as presenting optical codes printed on a substrate or presenting optical codes displayed on an electronic display device. These two methods of presenting optical codes to the scanner 130 require different readability settings to optimize first pass reading of the optical codes. Unfortunately, the optimized settings for maximum readability for one method results in lowering the readability for the other method and vice-versa. There is no good middle ground for the settings that does not result in lowering first pass performance for both methods of presenting an optical code to the scanner 130.

In general, optimizing settings for an optical code printed on a substrate requires maximum illumination and shorter exposure times to reduce blurring as a result of movement of the substrate while optimizing settings for an optical code displayed on an electronic display device requires turning off illumination to avoid wash out and lengthening exposure times. It should be noted that within each form of optical code presentation, the best readability settings will vary slightly because of different implementations within each form. For example, the substrates the optical codes are printed on are typically types of paper and can have a surface finish that is highly reflective such as a glossy finish or that is less reflective such as a matte finish. Each type of surface finish will affect the optimized readability setting. For optical codes that are displayed on an electronic display, the type of display, the type of glass or protective material and the brightness setting for the display will also affect the optimized readability setting.

The scanner 130 provides multiple scanning modes where each scanning mode defines a method for operating the scanning devices used to read optical codes. Each scanning mode defines a scanning method and defines either fixed settings for each of the scanning devices or defines how the settings are calculated. The scanning devices include illumination devices and image capture devices. The processor 410 assigns one of the scanning modes to each of the scanning windows 235, 220, 365. The scanning modes for each scanning window 235, 220, 365 can be changed at any time and options within a scanning mode can be changed at any time. The POS terminal 105 will send a request to the scanner 130 to change the scanning mode for one or more of the scanning windows 235, 220, 365 based on the current phase of a purchase transaction. For example, during the item identification phase of a purchase transaction, the scanning windows 235, 220, 365 would be assigned scanning modes that favor printed optical codes but during the payment phase when coupons would be entered, one or more of the scanning windows 235, 220, 365 would be reassigned to scanning modes that favor electronic optical codes.

The scanning modes include: 1) a full time mode optimized for reading only one of the two forms (printed or electronic) used to present optical codes; 2) a variable duty cycle mode that alternates between the printed and electronic presentation forms; and 3) an adaptive mode that adjusts the readability settings based on real-time feedback from the images being captured but initially defaults to a bias toward one of the two presentation forms.

The full time mode optimizes the readability settings for a scanning window to read either printed or electronic optical codes. For example, if the vertical scanning window 220 is assigned to the full time printed optical code mode, the processor 410 will turn on the illumination device 335 and set the output power to full power. This will cause the illumination device 335 to generate the maximum amount of light and direct the light through the vertical scanning window 220 to the target area 305. The processor 410 will also set the image exposure time for the image capture device 310 to a shorter time period that is compatible with the amount of light that will be reflected from the target area 305. The shorter exposure time will also reduce image blurring. These settings will optimize the vertical scanning window 220 for reading optical codes that are presented in printed form and scanned as the optical codes are moved through the target scanning area 305.

In the same example, if the vertical scanning window 220 is assigned to the full time electronic optical code mode, the processor 410 will turn off the illumination device 335 and set the image exposure time for the image capture device 310 to a longer time period that is compatible with the amount of light produced by an electronic display. Since the electronic display produces its own light, no additional illumination is required. Additional illumination could also reduce readability by causing wash out of the display. In some embodiments, the exposure time for electronic optical codes is set to 1/30 of a second to capture at least one full screen refresh cycle.

The variable duty cycle mode switches between settings optimized for printed optical codes and settings optimized for electronic optical codes based on the duty cycle that has been set. For example, the duty cycle can be set to 80% printed optical codes and 20% electronic optical codes. This means that during a given period of time, 80% of the images will be captured while the readability settings are optimized for reading printed optical codes and 20% of the images will be captured while the readability settings are optimized for reading electronic optical codes. The images captured while the readability settings are optimized for reading electronic optical codes are evenly distributed among the images captured while the readability settings are optimized for reading printed optical codes. The duty cycle for either mode can range from 5% to 95%. If 10 images are captured in a period of time with a 80% duty cycle for printed optical codes, the readability settings for the scanning devices would be set as follows for each captured image:

Image 1: settings optimized to read electronic form
Image 2: settings optimized to read print form
Image 3: settings optimized to read print form
Image 4: settings optimized to read print form
Image 5: settings optimized to read print form
Image 6: settings optimized to read electronic form
Image 7: settings optimized to read print form
Image 8: settings optimized to read print form
Image 9: settings optimized to read print form
Image 10: settings optimized to read print form The adaptive mode adjusts the readability settings for the illumination device and image capture device based on an analysis of data from captured images. An initial set of starting values are assigned that can be biased toward printed or electronic optical codes but are not the same as the optimized settings for these optical codes. The processor 410 processes each captured image and attempts to identify and read any optical code that may be present. During the image processing, the processor 410 detects if the readability settings are less than optimum for the scene in the captured image and then uses this data as feedback to adjust the current readability settings. If an electronic optical code is being imaged, the processor 410 will detect a wash out condition and adjust the settings incrementally toward the best optimized settings for this electronic optical code which will eliminate the wash out or other issues. After multiple attempts to read the optical code, the settings will generally approach or match the optimized settings for the electronic optical codes. However, this dynamic mode of adjusting the settings allows for differences between different types of electronic devices or different types of printed optical codes. It is not the fastest mode but it is the most flexible mode in that it will adjust settings until the optical code is read.

Figure 5:
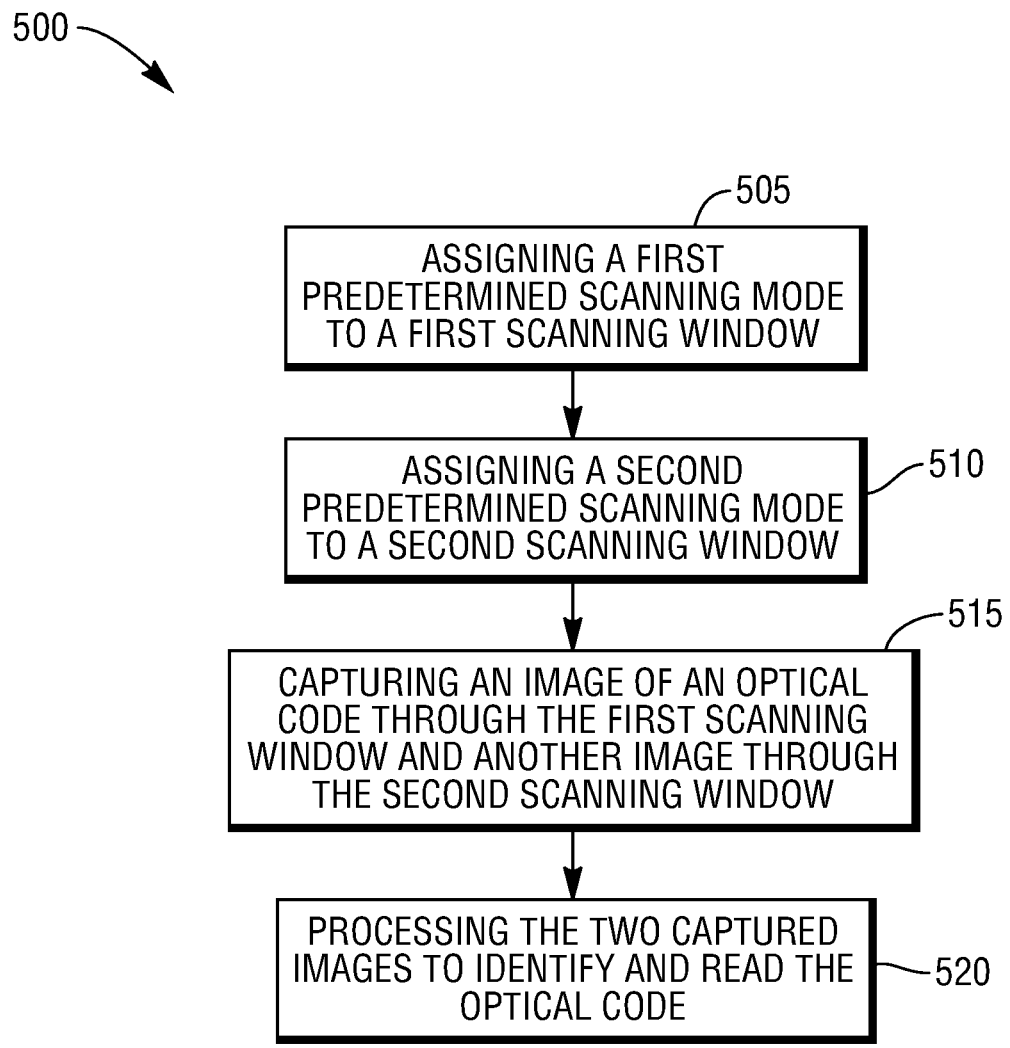
FIG. 5 is a high-level flow diagram illustrating a method of operating the optical code scanner.

Turning to FIG. 5, there is provided a high-level flow diagram illustrating a method 500 of operating the optical code scanner 130. The following method describes one embodiment of the optical code scanner 130 and one example method for operating it. The method described below is performed by the processor 410 in the optical code scanner 130.

In step 505, the processor 410 assigns a first predetermined scanning mode to the first scanning window. In this example, the first scanning window is the vertical scanning window 220 but in other examples it could be the horizontal scanning window 235 or in other embodiments another scanning window. In this example, the first predetermined scanning mode is the full time mode which defaults to settings optimized to read printed optical codes. However, the command to assign a scanning window to the full time mode of operation also includes an option that changes the default to settings optimized to read electronic optical codes. The scanning window will continue to operate in the assigned scanning mode until it is reassigned or an option is changed such as changing between printed and electronic or electronic and printing when in the full time scanning mode.

Assigning a scanning mode to a scanning window includes adjusting the settings for the illumination device and image capture device that operates through the scanning window to values defined for the assigned scanning mode. In the full time mode, the settings are fixed to either be optimized for printed optical codes or optimized for electronic optical codes until a command to reassign the options of the full time scanning mode is executed. Reassigning the options includes remaining in the full time mode but changing the optimization to a different form of optical code such as switching from printed to electronic or from electronic to printed form.

The variable duty cycle mode and the adaptive mode each use scanning methods that adjust the settings for the illumination device and the image capture device without external commands to change scanning mode options.

In step 510, the processor 410 assigns a second predetermined scanning mode to the second scanning window. In this example, the second scanning window is the horizontal scanning window 235 but in other examples it could be the vertical scanning window 220 or in other embodiments another scanning window. In this example, the second predetermined scanning mode is the variable duty cycle mode. The variable duty cycle mode includes an option that identifies either printed or electronic as the preferred presentation form for optical codes and a duty cycle or percentage of time the scanning window should be optimized for the preferred presentation form. For example, the command to assign a scanning window to the variable duty cycle could specify the preferred presentation form as electronic and the percentage as 80%. The processor 410 would then optimize the settings for the illumination device and the image capture device for the scanning window to read electronic optical codes for 80% of the time and would optimize for reading printed optical codes for 20% of the time. The optimization for reading printed optical code is evenly distributed across the time period. In this step, the preferred form is set to "printed" and the duty cycle is "70%". In addition to these two scanning modes, any of the scanning windows can also be set to the adaptive scanning mode.

In step 515, the processor 410 causes the first image capture device 310 to capture an image of an optical code through the first scanning window which is the vertical scanning window 220 of the scanner 130. The processor 410 further causes the second image capture device 310 to capture an image of the optical code through the second scanning window which is the horizontal scanning window 235. The first illumination device 335 and second illumination device 330 are set to the appropriate mode of operation based on the selected scanning mode prior to capturing the images. In some embodiments, the capturing of images from different adjacent windows are staggered so that the illumination device from the non-capturing window can either be turned off or matched to the same value as the capturing window. This prevents the illumination device from an adjacent non-capturing window from interfering with the illumination device of the window through which an image is being captured.

In step 520, the processor 410 processes the two captured images to identify and read the optical code from at least one of the captured images. The information from the read optical code is then transmitted to the computer 110.

Although the present invention has been described with particular reference to certain preferred embodiments thereof, variations and modifications of the present invention can be effected within the spirit and scope of the following claims. For example, it is envisioned that an embodiment of the optical scanner 130 is used within a kiosk such as an airport check-in kiosk that has at least two scanning windows where one scanning window is optimized for reading paper optical codes and another is optimized for electronic optical codes.

What is claimed is:

1. A computer implemented method for controlling an optical code scanner that reads optical codes in printed and electronic forms, the method comprising the steps of:
   identifying a current phase of a transaction;
   configuring, based upon the current phase of the transaction, the optical code scanner from a first mode of operation to a second mode of operation, wherein the first mode of operation optimizes readability of the optical code in the printed form and the second mode of operation optimizes readability of the optical code in the electronic form, including adjusting illumination through the scanning window from a first optimal level for reading the optical code in the printed form during the first mode of operation to a second optimal level for reading the optical code in the electronic form during the second mode of operation, wherein the second optimal level is less than the first optimal level;
   capturing an image through the scanning window; and
   processing the image to identify and read a captured optical code from the image.

2. The method of claim 1, wherein the optical code in the electronic form is displayed by a mobile computing device.

3. The method of claim 1, further comprising:
   configuring the optical code scanner from the second mode of operation to the first mode of operation, including adjusting illumination through the scanning window to the second optimal level;
   capturing an image through the scanning window; and
   processing the image to identify and read a captured optical code from the image.

4. The method of claim 1, wherein configuring comprises alternating between the first mode of operation and the second mode of operation according to a duty cycle.

5. The method of claim 4, wherein the duty cycle is biased towards the first mode of operation.

6. The method of claim 1, wherein configuring comprises configuring the optical code scanner based upon data from captured images.

* * * * *